April 25, 1939.  H. A. UNKE  2,156,169
THREADED HOLLOW ARTICLE
Filed May 28, 1936  2 Sheets-Sheet 1
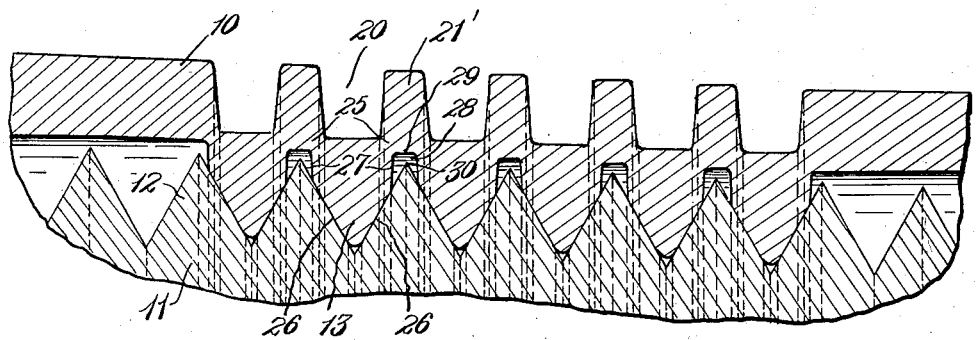
FIG. 4
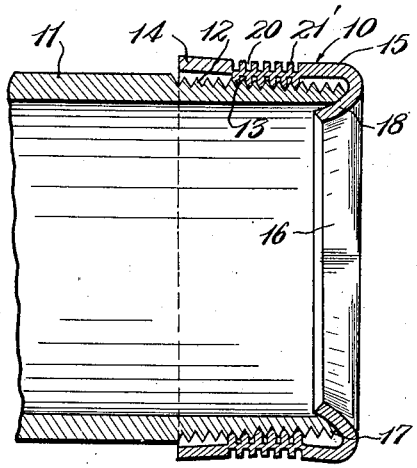
FIG. 3
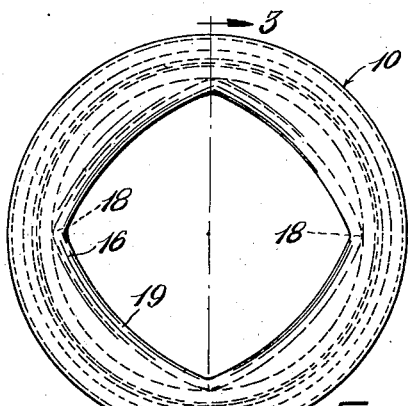
FIG. 2
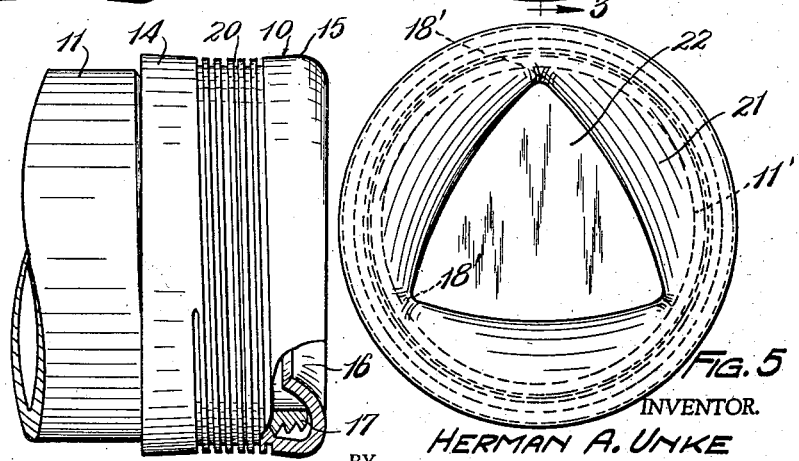
FIG. 1
FIG. 5
INVENTOR.
HERMAN A. UNKE
BY Kwis Hudson & Kent
ATTORNEYS Patented Apr. 25, 1939

2,156,169

UNITED STATES PATENT OFFICE 2,156,169

THREADED HOLLOW ARTICLE

Herman A. Unke, Lakewood, Ohio

Application May 28, 1936, Serial No. 82,263

6 Claims. (Cl. 138—96)

This invention relates to threaded hollow metal articles and, as its principal object, aims to provide a novel screw thread and a novel joint utilizing such thread.

Another object of this invention is to provide a threaded hollow metal article of novel construction.

Still another object of this invention is to provide an improved form of threaded hollow metal article having on one side of the wall thereof a continuous solid helical thread formed by metal displaced from the wall of the article.

A further object of this invention is to provide a novel pipe joint having cooperating screw threads each of which is a solid continuous helical thread formed by metal displaced from the wall of the pipe section.

Yet another object of this invention is to provide an improved thread protector comprising a metal sleeve having a continuous solid helical thread formed from metal displaced from the wall of the sleeve, and also embodying certain other novel features.

This application is in part a continuation of my earlier application Serial No. 717,635, filed May 27, 1934.

Other objects and advantages of the invention will be apparent from the foregoing description when taken in conjunction with the accompanying sheets of drawings, in which Fig. 1 is an end elevation of a hollow metal article constructed according to my invention, the article illustrated in this instance being a thread protector applied to the end of a section of pipe.

Fig. 2 is a side elevation thereof with parts broken away.

Fig. 3 is a longitudinal sectional view taken through the pipe section and the protector, as indicated by line 3—3 of Fig. 1.

Fig. 4 is a partial sectional view, on an enlarged scale, showing the form and construction of my novel thread as used on the protector.

Fig. 5 is an end view of a slightly different form of thread protector constructed according to my invention.

Figure 6:
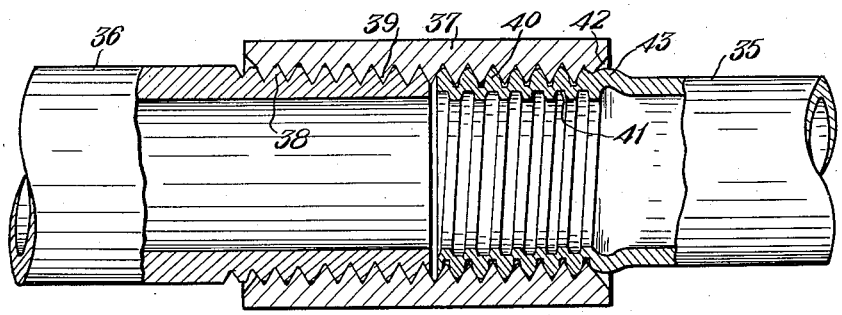
Fig. 6 is a longitudinal sectional view taken through a screwed joint which embodies a threaded article constructed according to my invention.

In the accompanying drawings, to which more detailed reference will now be made, I have shown several forms of threaded hollow articles embodying the principles of my invention. Before proceeding with the detailed description of these hollow threaded articles, I desire it to be understood that my novel screw thread may be embodied in various forms of hollow metal articles and that screwed connections utilizing my novel thread may be applied to numerous uses. As examples of hollow metal articles to which the present invention may be applied, I have shown a protector adapted to be applied to the thread of a pipe or other article and have shown pipe sections connected by a novel screwed joint.

As shown in Figs. 1 to 5 of the drawings, my invention may be embodied in an improved protector of the type adapted to be applied to the threaded portion of a metal article such as the threaded end of a section of pipe. This protector may comprise an annular metal sleeve 10 which is adapted to telescope the threaded portion of an article such as the section of pipe 11, for the purpose of protecting the threads 12 of such article from blows which might damage the threads and from foreign matter which might clog or corrode the threads. In this instance the pipe 11 is shown as having the threads 12 externally thereof and my thread protector is accordingly constructed to surround or telescope over the threaded portion of the pipe end, but it will be understood, of course, that the protector may be constructed for application to an internally threaded pipe or article and, in the latter case, the protector would be arranged to telescope into the threaded portion of the article.

The metal sleeve 10 may be provided on one surface thereof, namely the inner surface when the protector is to be applied to an externally threaded article as illustrated in Fig. 3, with a helical thread 13 which cooperates with the thread 12 of the pipe to retain the protector thereon. The thread 13 is continuous around on the inside of the wall of the metal sleeve but preferably extends over only an intermediate section of the length of the sleeve while the sleeve sections or portions 14 and 15 on opposite sides of such intermediate section are left unthreaded.

The sleeve which forms the protector may also be provided at its outer end with an internal angularly disposed annular flange 16 which cooperates with the extreme end portion 17 of the pipe. This internal flange protects the end of the pipe and prevents foreign matter from entering between the pipe and the protector sleeve. This flange also performs the important function of a locking part which engages the end portion 17 of the pipe and prevents the protector from becoming unscrewed as the result of the jarring and repeated blows to which the pipe might be subjected during shipping or handling.

To improve the locking connection obtained between the sleeve and the end of the pipe I prefer to construct the flange 16 with portions thereof displaced or distorted to an out-of-round condition, as illustrated in Fig. 1. This out-of-round condition provides the flange with convex locking parts 18 at circumferentially spaced points which engage the end of the pipe when the protector is applied thereto. This out-of-round shape or condition of the flange 16 may be obtained by deflecting or bending the flange at a plurality of circumferentially spaced points, as shown in Fig. 2, to form these convex contact portions or locking parts 18. The portions 19 of the flange which are located intermediate the contact portions 18 are relatively flattened, as seen in Fig. 1, and when the protector is applied to the pipe the contact portions 18 engage the pipe end at spaced points while these relatively flattened intermediate portions remain spaced from the end of the pipe, as seen in Figs. 1 and 2.

Instead of providing the outer end of the protector with an opening around which the flange 16 extends, as shown in Fig. 1, the outer end may be closed by a transversely extending integral wall 21, as shown in Fig. 5. In many instances such a transverse end wall is desirable because it gives the protector the form of a closed cap which, when applied to a pipe end, prevents the entry of water and dirt. I obtain the above mentioned novel locking cooperation between the end wall 21 and the outer end of the pipe section 11' by providing the end wall with an inwardly deflected section 22 centrally thereof. This inwardly deflected section, which is located substantially centrally of the end wall and which may be of triangular or any other desired form, is of such size that the corners thereof form convex contact portions or locking parts 18'. These locking parts extend axially inwardly of the protector sleeve and engage the end of the pipe section at circumferentially spaced points.

The construction of the thread 13 constitutes a very important feature of my invention and, as shown in Figs. 2, 3 and 4, this thread is a continuous solid helical thread formed from metal displaced radially inwardly from the wall of the metal sleeve 10. In forming the thread 13 a continuous helical groove 20 is formed on the outer surface of the sleeve, thereby displacing inwardly from the wall the metal required for the solid thread. The displacement of metal for forming the thread 13 may be accomplished by a pushing of sections of metal inwardly from the wall of the sleeve accompanied by a shearing action. In thus forming the thread 13 a helically extending ridge or fin 21' of original metal of the sleeve is left intact between the adjacent convolutions of the groove 20. This helically extending fin connects the adjacent convolutions of the thread 13 so that the article remains intact as a sleeve. The thread may be formed by any suitable method step such as shearing, swaging, rolling or the like, or any appropriate combination of these or other method steps. Any suitable means may be used in forming the threads, such as rolls or dies, or a combination of rolls and dies. One suitable method for forming the thread 13 is disclosed in my copending application Serial No. 7,060, filed February 18, 1935, now Patent No. 2,054,182, issued September 15, 1936.

To briefly explain the method disclosed in my copending application, I might state that in forming the thread 13 by displacing metal from the groove 20, the wall of the sleeve 10 is supported at spaced points by lands or ridges of one die member or roll and the metal of the sleeve is forced radially by the ridges of a die member or roll applied to the opposite side of the wall and engaging the same at points intermediate the points of support. The die rolls acting on opposite sides of the wall of the sleeve with their ridges in staggered or offset relation cause the above mentioned shearing action whereby metal of the sleeve is displaced radially to form a solid continuous helical thread 13. I have found that during this shearing action the metal of the wall of the sleeve is worked at the points 25, which connect the thread with the original portions 21 of the sleeve, and that although the metal at these connecting points may be of less thickness than the original thickness of the wall of the sleeve, the working of this metal hardens and strengthens the same so that the threaded section of the article in fact has greater tensile strength than the original wall of the sleeve.

As shown in Fig. 4 of the drawings, metal which has been displaced inwardly from the groove 20 and the wall of the sleeve may be shaped to provide the solid thread 13 with tapered faces 26 so that the thread is substantially a V-thread. Adjacent its base the thread 13 may have, on opposite sides thereof, substantially parallel or slightly tapered faces 27. The tapered faces 26 of the adjacent convolutions form the sides of a substantially V-shaped thread groove and, when a protector is applied to the threaded article, this groove receives the cut thread 12 of the article with the tapered faces 26 engaging the tapered faces of the thread of the article.

The straight or parallel faces 27 of adjacent convolutions of the thread 13 form the sides of a relief or extension groove 28. The bottom 29 of this extension groove is a helically extending substantially flat strip or section of original wall surface of the sleeve which was engaged by the ridges or lands of the supporting or mandrel die. This extension groove 28 is a groove of substantially square cross-section which communicates with, and is at the bottom of, the V-groove formed by the tapered faces 26. When the protector is applied to the threaded article this relief groove accommodates the tops 30 of the thread convolutions of the article so that no part of the protector will come into contact with these tops to dull or damage the same.

It will be seen from the shape of the thread 13, as illustrated in the drawings and as just described, that this thread is a continuous helical thread which is solid from its base or root to its top and closely approximates a thread formed by cutting dies. Hence it will be seen that when the protector is applied to an article having cut threads, such as the pipe 11, it will substantially fit the article and the thread 13 will readily cooperate with the cut threads by screwing so that the latter will not be damaged in the application or removal of the protector or by undue looseness or rattling during the handling or shipment of the threaded articles.

When my improved protector is applied to a threaded article, such as the end of the pipe 11, it is screwed onto the threaded portion of the pipe by relatively rotating the protector and pipe to cause the thread 13 to follow along in the groove of the thread 12 of the pipe. The protector is screwed onto the pipe end far enough to cause the convex locking parts 18 of the flange 16 to engage the end portion 17 of the pipe at spaced points and this engagement causes the protector to be locked onto the pipe so that it will not rattle on the threads and will not be readily jarred loose. It will be noted from Fig. 3 that when the protector is fully applied to the pipe end, only the thread 13 engages the threads of the pipe and both the sleeve sections 14 and 15 are spaced from the threads of the pipe.

In Figs. 6 to 9 inclusive I have shown the novel thread of my invention applied to other hollow metal articles and have shown screwed joints of improved form produced by the use of this novel thread.

Before proceeding with the description of the articles of Figs. 6 to 9 it might be stated that my novel thread can be advantageously used on certain hollow metal articles, particularly on thin-walled electric metal tubing or conduit. Heretofore the use of such thin-walled electric metal tubing has been relatively restricted because of the absence of a satisfactory form of connection between sections or lengths of this tubing. The usual screwed connection formed by fittings applied to threads cut on the ends of the tubing is not available for use with this thin-walled electric metal tubing because the wall is so thin that if satisfactory threads are cut thereon the tensile strength of the tube is reduced below a permissible value. My novel thread, formed by metal displaced from the wall of the article, is especially useful on such thin-walled electric tubing because the forming of this thread on the tubing increases rather than decreases the tensile strength of the tube at the point of threading. Furthermore, since my novel thread closely approximates a cut thread it will cooperate with standard fittings having the usual cut threads and a substantially fluid-tight joint can be obtained in all instances.

In Fig. 6 of the drawings I have shown a section of thin-walled electric metal tubing 35 connected with a section of usual rigid electric metal tubing 36 by means of a straight threaded coupling 37. The rigid tubing 36 is shown as having the usual pipe thread 38 cut thereon and the coupling 37 has a cut thread 39 which cooperates with the thread 38. The thin-walled tubing 35 is provided at the end thereof with a threaded section which is also screwed into the coupling 37. The thread 40 of this threaded section is my novel thread formed from metal displaced from the wall of the tubing. As shown in the drawings, the thread 40 is a solid continuous helical thread of substantially V-shape. Opposite the thread 40 and on the other side of the wall of the tubing is a helically extending groove 41 from which metal was displaced during the forming of the thread. The manner of forming the thread 40 and the groove 41 and the details of construction thereof are substantially identical to the operations and details of construction already explained in connection with the thread 13 of Fig. 4.

As is usual in screwed pipe fittings, the coupling 37 may have a chamfer 42 at the ends thereof and to increase the tightness of the threaded connection formed by the cooperation of the thread 40 with the thread 39 I provide the tubing 35 with an annular shoulder 43 which is engaged by the chamfer 42 of the coupling. The annular shoulder 43 is preferably formed on the tubing at the inner end of the threaded section and forms a stop against which the chamfer of the coupling jams or wedges when the parts have been screwed together.

Figure 7:
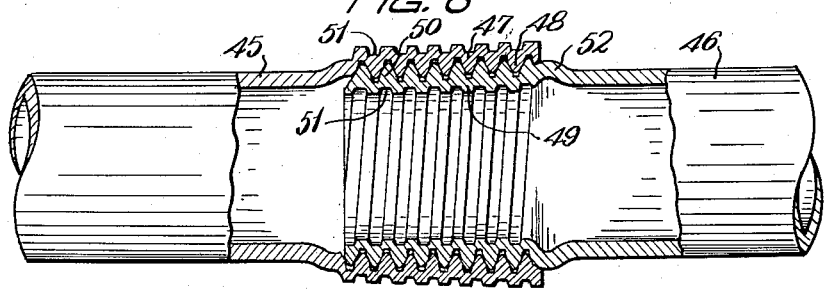
Fig. 7 is a longitudinal sectional view taken through a screwed joint formed by pipe ends which have been threaded according to my invention.

In Fig. 7 I have shown another novel screwed joint but, in this instance, the joint is formed between two sections 45 and 46 of thin-walled electrical tubing. The ends of the tube sections telescope each other and, therefore, the end 47 of the tube section 45 is provided with an internal thread 48 and the end 49 of the tube section 46 is provided with an external thread 50. The threads 48 and 50 are solid continuous helical threads formed by metal displaced from the wall of the tube sections as already explained and, during the forming of the thread on each of these articles, a continuous helical groove 51 is formed on the other side of the article wall opposite the solid thread. To permit the pipe ends to telescope each other, the end 47 should be expanded or belled either prior to or during the threading operation. Such enlarging of the end 47 may be accomplished in any appropriate way and by any suitable means.

In forming the threads on the ends 47 and 49 the operation may be carried out so as to result in the threaded sections being tapered to correspond with the taper at which cut pipe threads are usually formed. By providing the ends with such tapering threaded sections it will be seen that when the ends are screwed together a tighter joint will be produced. To increase the tightness of the joint formed by the threaded ends 47 and 49 I may provide the pipe section 46 with an annular shoulder 52 against which the extreme end of the section 45 jams or wedges when the threaded sections are fully screwed together.

Figure 8:
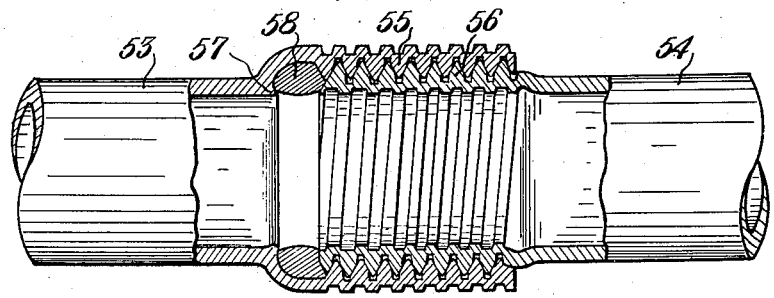
Fig. 8 is a similar longitudinal sectional view showing another joint formed by pipe ends which have been threaded according to my invention.

In Fig. 8 I have shown thin-walled electric tubing or pipe sections 53 and 54 which are provided with cooperating threaded ends 55 and 56. The ends 55 and 56 are each provided with the novel solid continuous helical thread of my invention and, in this respect, are similar to the cooperating threaded ends of Fig. 7. However, in forming the threads on the ends 55 and 56 the threaded sections are not tapered, but remain straight sections. The end 55 is belled or expanded to receive the end 56, such belling or expanding preferably being done before the threading operation. The tightness of the joint formed by the threaded ends 55 and 56 may be improved by providing the bell end 55 with an internal annular shoulder 57 and an annular sealing gasket 58 which is compressed between the shoulder 57 and the end 56. The annular shoulder 57 may be formed by the insertion of a tool into the end of the section 53 before the threading operation, such tool causing metal to be scraped from the inner wall of the tube and pushed up as an annularly extending burr.

Figure 9:
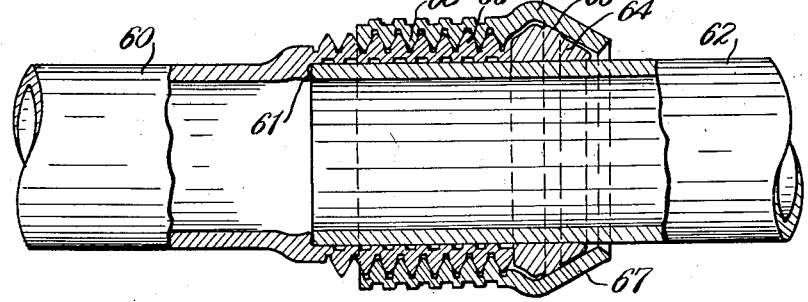
Fig. 9 is a longitudinal sectional view taken through another pipe joint embodying my invention.

In Fig. 9 of the drawings I have shown my novel thread embodied in another form of pipe connection. In this connection the end of a tube or pipe section 60 is expanded or belled and provided with an internal annual shoulder 61. The straight unthreaded end of a pipe or tube section 62 is inserted into the expanded end of the section 60 and engages the internal annular shoulder 61. The expanded end of the section 60 is provided externally thereof with my novel solid helical thread 63 which is formed from metal displaced from the wall of the tube. To render the joint substantially fluid-tight and to prevent withdrawal of the end of the section 62 I provide an annular sealing gasket 64 and a nut or bushing 65 for compressing the same. The gasket 64 may be a ring of lead, or other suitable material, which surrounds the section 62 and is of tapering cross-section. When formed of metal this sealing ring preferably has a raised annular ridge 66 on the tapered surface thereof which is engaged and crushed by a tapered sleeve portion 67 of the nut 65. The tapered sleeve portion 67 also presses the gasket against the extreme outer end of the section 60. The pressing of the gasket against the end of the section 60 and against the wall of the tube 62 by the tapered sleeve portion 67, causes a substantially fluid-tight seal to be formed and also causes the section 62 to be frictionally gripped so that the end thereof will not be withdrawn from the expanded end of the section 60.

For connecting the bushing 65 with the threaded portion of the tube 60 I provide the bushing with an internal thread 68, this internal thread being my novel solid continuous thread formed from metal displaced from the wall of the bushing.

From the foregoing description and accompanying drawings it will now be readily understood that I have provided a novel thread and threaded connection which is of great utility and can be economically formed on various hollow metal articles without reducing the tensile strength of the article, as would be the case if the usual threads were cut thereon. It will also be understood that I have provided a novel form of pipe connection and thread protector utilizing this novel thread.

Having thus described my invention, I claim:

1. A tubular metal article for screw connection with a threaded member, having a continuous helical groove formed in one side of the wall of the article and a solid continuous helical thread of more than one convolution on the other side of the wall directly opposite the groove and formed by metal displaced from the wall by the forming of said groove, the adjacent convolutions of said thread defining therebetween a continuous groove into which the thread of said member can be screwed.

2. A hollow metal article for screw connection with a threaded member, having a helical thread thereon of more than one convolution formed to provide a substantially V-shaped groove between adjacent convolutions and an extension groove at the bottom of the V-groove, said thread being formed from metal displaced from the wall of the article and being solid from its base to its top.

3. A protector for the threaded portion of an article comprising a metal sleeve adapted for screw connection with said threaded portion and having a helical thread on one surface thereof for cooperation with the threads of said article, said helical thread being formed to provide a substantially V-shaped groove between adjacent convolutions and a relief groove at the bottom of the V-groove to provide clearance for the tops of the threads of said article.

4. A thread protector comprising a metal sleeve having a continuous helical groove on its outer surface and a continuous solid helical thread on its inner surface, said thread being formed from metal displaced inwardly from said helical groove with a substantially V-shaped groove between adjacent convolutions and a substantially square extension groove at the bottom of the V-groove.

5. A thread protector comprising a metal sleeve adapted to telescope the threaded portion of a tubular article and having a continuous angularly disposed internal annual flange at one end thereof for cooperation with the end portion of the tubular article, said flange having its inner peripheral portion deflected into the interior of said sleeve and provided with contact parts to interiorly engage said end portion of the article at spaced points only, and said flange also having segmentally shaped portions connecting said contact parts.

6. A thread protector comprising a metal sleeve adapted to telescope the threaded end portion of a tubular article and having a closed end wall with a central portion thereof deflected inwardly, said inwardly deflected portion being of substantially polygonal shape and providing contact parts at the corners thereof to engage said end portion of the article at spaced points only.

HERMAN A. UNKE.